(12) United States Patent
Cohen

(10) Patent No.: US 7,349,418 B1
(45) Date of Patent: Mar. 25, 2008

(54) RESIDUE-BASED ENCODING OF PACKET LENGTHS OF PARTICULAR USE IN PROCESSING AND SCHEDULING PACKETS

(75) Inventor: Earl T. Cohen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1088 days.

(21) Appl. No.: 10/617,539

(22) Filed: Jul. 11, 2003

(51) Int. Cl.
*H04L 12/28* (2006.01)
*H04L 12/56* (2006.01)
*G01R 31/08* (2006.01)
*G06F 11/00* (2006.01)

(52) U.S. Cl. ..................................... 370/412; 370/468
(58) Field of Classification Search ................. 370/412
See application file for complete search history.

(56) References Cited

OTHER PUBLICATIONS

Camrass et al., Encoding Message Lengths for Data Transmission, IEEE Transactions of Information Theory, vol. IT-24, No. 4, Jul. 1978.
Alan Huang, An Optical Residue Arithmetic Unit, International Conference on Computer Architecture, Proceedings of the 5th Annual Symposium on Computer Architecture, pp. 17-23, ACM Press, 1978.
Witten et al., Arithmetic Coding for Data Compression, Communications of the ACM, vol. 30, Issue 6, pp. 520-540, ACM Press, Jun. 1987.

*Primary Examiner*—Chau Nguyen
*Assistant Examiner*—Sori A Aga
(74) *Attorney, Agent, or Firm*—The Law Office of Kirk D. Williams

(57) ABSTRACT

Processing a packet typically includes enqueuing the packet on to a queue when it arrives at a device, and then at some later time under control of the scheduler, dequeuing the packet for transmission. The scheduler needs some representation of the packet length for its uses when dequeuing. By storing the packet length as an adjusted packet length containing fewer bits, the scheduler and any storage of the packets lengths in the queues are reduced in complexity/size. One implementation maintains a residue amount corresponding to one or more packet queues or streams of packets. The residue amount is updated to maintain a forward looking or lagging behind indication of the error induced by this approximation. An adjusted packet length for the packet is determined based on its actual packet length and the residue amount. The residue amount is accordingly updated to reduce any long term error induced by using the adjusted packet lengths.

40 Claims, 12 Drawing Sheets

PSEUDO CODE
400

```
/*
 * The residue tracks how many bytes we're behind -- positive is
 * more behind. The residue holds a 4-bit signed number between
 * -8 and +7.
 * pkt_lngth is the actual packet length in bytes.
 * encd_pkt_lngth is the compressed (shorter, less resolution)
 * packet length associated with the enqueued packet and used
 * by the scheduler.
 */
/* m is the 4 LSBs of the packet length */
m = pkt_lngth % 16;
if ((residue + m) >= 8) {
/*
 * residue pushes us at or past the +1/2 point; since we
 * round up in this case, we want to decrease the residue.
 */
residue = residue + m - 16;
encd_pkt_lngth = (pkt_lngth >> 4) + 1; /* round up */
}
else {
/*
 * residue doesn't push us at or past the +1/2 point; since
 * we round down in this case, we want to increase the
 * residue.
 */
residue = residue + m;
encd_pkt_lngth = (pkt_lngth >> 4); /* round down */
}
```

RESIDUE-BASED ENCODING OF PACKET LENGTHS OF PARTICULAR USE IN PROCESSING AND SCHEDULING PACKETS

TECHNICAL FIELD

One embodiment of the invention especially relates to communications and computer systems; and more particularly, one embodiment relates to residue-based encoding of packet lengths for use in processing packets, such as, but not limited to identifying lengths of queued packets for scheduling or other purposes in routers, packet switching systems, and other devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Scheduling of packets in network systems is done based on many criteria. Generally, there are many individual queues of packets, arranged in some hierarchical fashion based on their properties and/or interfaces. A scheduler attempts to serve each of the leaf queues (and each of the aggregated nodes in the hierarchy above the leaves) fairly, where the definition of "fair" is usually based on delivered bandwidth. To do this, current schedulers use the exact length (in bytes) of each packet as it is scheduled, and this information must be saved for each packet in each queue. In a typical system running at 10 Gbps, there could be as many as 4M packets present. Each of which must have an associated packet length. With an approximate 10K maximum transfer unit (MTU), each packet length would require 14 bits, and storing 4M packet lengths would require 56 Mb of storage. While this amount of storage is small compared to the actual packet data, the packet lengths must generally be saved in faster (and more expensive) SRAM control structures (for ease and latency of access), as compared to the bulk DRAM generally used to hold the packet data. Using a packet length, the scheduler can determine how much traffic a given queue consumed in sending that particular packet, and can decide based on this when next to serve that queue in relation to all other queues.

The scheduling problem is very complex due to many different constraints used in defining what is fair, and due to the hierarchical nature of the scheduling problem, as the scheduler must be fair at each layer of the hierarchical scheduling tree. Doing scheduling generally calls for some amount of math performed on the packet lengths. For example, updating token buckets, or computing next service times, and these computations must be done at all layers of the scheduling hierarchy. Furthermore, there are large numbers of queues, each of which must store and track packet lengths. Simply using packet lengths with less resolution (e.g., fewer bits such as by dropping some number of low-order bits) would simplify the implementation significantly, but this cannot be done because any loss of precision in the packet lengths will result in accumulated errors in the scheduling process.

For example, packet lengths are nominally 14 bits (to support an approximate 10K MTU). If the scheduler only used the upper 8 bits, each packet scheduled could be off by between 0 and 63 bytes. This would lead to a very large accumulated error in a very short time. What is desired is a means to shorten the packet lengths associated with each packet and seen by the scheduler without accumulating any long-term errors in the amount of data being scheduled.

SUMMARY

Disclosed are, inter alia, methods, apparatus, data structures, computer-readable medium, mechanisms, and means for adaptively adjusting values, including, but not limited to lengths of packets for use in scheduling or other processing of packets.

One embodiment maintains a residue amount corresponding to one or more packet queues or streams of packets. A particular packet length of a packet associated with the packet queues or streams of packets is identified. An adjusted packet length corresponding to the particular packet length is determined based on the particular packet length and the residue amount. The residue amount is updated based on the residue amount and the particular packet length. In one embodiment, one or more packet operations associated with the packet are performed based on the adjusted packet length. In one embodiment, the packet is scheduled based on the adjusted packet length.

In one embodiment, the particular packet length includes a least significant portion, and updating the residue amount includes adding the residue amount and the least significant portion. In one embodiment, the particular packet length includes a least significant portion and a most significant portion, and determining the adjusted packet length includes identifying whether to use the most significant portion as the adjusted packet length or a value based on the most significant portion. In one embodiment, the value is one more than the most significant portion. In one embodiment, identifying whether to use the most significant portion as the adjusted packet length or a value based on the most significant portion is performed based on a result of updating the residue amount. In one embodiment, the residue amount is a lagging behind indication. In one embodiment, the residue amount is a forward looking indication.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 4 illustrates pseudo code exemplifying an adjustment mechanism used in one embodiment.

DETAILED DESCRIPTION

Figure 1A:
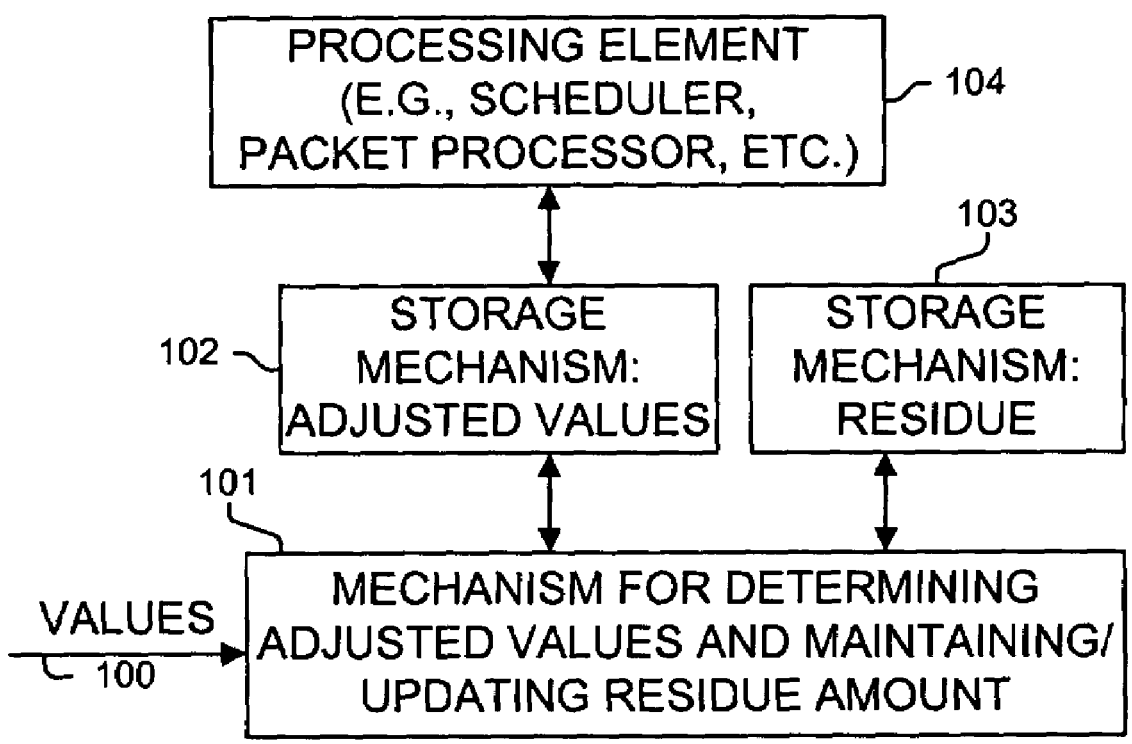
FIG. 1A is a block diagram illustrating one embodiment for adjusting values.

Disclosed are, inter alia, methods, apparatus, data structures, computer-readable medium, mechanisms, and means for adjusting values and their use, such as, but not limited to adaptively adjusting original packet lengths to those that require less bits to store the value for use in routers, packet switching systems, and other devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "computer-readable storage medium" refers to tangible computer-readable medium, and as such, computer-readable storage medium does not include signaling mechanisms nor signals. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for adaptively adjusting values, including, but not limited to lengths of packets for use in scheduling or other processing of packets.

Processing a packet typically includes enqueuing the packet on to a queue when it arrives at a device, and then at some later time under control of the scheduler, dequeuing the packet for transmission. The scheduler needs some representation of the packet length for its uses when dequeuing. By storing the packet length as an adjusted packet length containing fewer bits, the scheduler and any storage of the packets lengths in the queues are reduced in complexity/size. One embodiment maintains a residue amount corresponding to one or more packet queues or streams of packets. The residue amount is updated to maintain a forward looking or lagging behind indication of the error induced by this approximation. An adjusted packet length for the packet is determined based on its actual packet length and the residue amount. The residue amount is accordingly updated to reduce any long term error induced by using the adjusted packet lengths. In one embodiment, one or more packet operations associated with the packet are performed based on the adjusted packet length. In one embodiment, the packet is scheduled based on the adjusted packet length.

In one embodiment, the particular packet length includes a least significant portion, and updating the residue amount includes adding the residue amount and the least significant portion. In one embodiment, the particular packet length includes a least significant portion and a most significant portion, and determining the adjusted packet length includes identifying whether to use the most significant portion as the adjusted packet length or a value based on the most significant portion. In one embodiment, the value is one more than the most significant portion. In one embodiment, identifying whether to use the most significant portion as the adjusted packet length or a value based on the most significant portion is performed based on a result of updating the residue amount. In one embodiment, the residue amount is a lagging behind indication. In one embodiment, the residue amount is a forward looking indication.

One embodiment uses a residue amount associated with each queue. The residue amount acts as the accumulated least significant bits (LSBs) of all the packet lengths for packets stored in that queue. When a packet is enqueued, the packet length associated with that packet is an adjusted version of the most significant bits (MSBs) of that packet's lengths and adjusted in a manner that bounds the residue amount and thus limits any long-term (accumulated) error. For example, one embodiment uses as the adjusted packet length the MSBs of the actual packet length, either rounded down or rounded up, with the choice of rounding direction made to minimize the absolute value of the accumulated error.

In this manner, significant space may be saved in storing packet lengths because only one residue amount is stored per queue. The residue amount acts as the LSBs of all the packets in that queue. Hence, all saved packets, both those in the queues and those in process in the scheduling hierarchy, can use the shorter, adjusted packet lengths. The logical computations in the scheduling hierarchy, and the sizes of various counters and/or token buckets the scheduler uses, can be reduced in size, simplifying the complexity of the scheduling process.

For example, one embodiment operates on 14-bit packet lengths, but only desires to store and manipulate 6 bits per packet. An 8-bit residue amount is used, with the value of the residue amount ranging between −128 and +127. Initially, the residue amount is zero (e.g., no accumulated error). When a packet is enqueued, the 8 LSBs of the packet length are compared with the residue amount, and the packet length is stored in an encoded fashion as either the six MSBs of the packet length, or one more than that, based on the following. a). If the 8 LSBs of the packet length plus the existing residue amount equals or exceed 128, the adjusted packet length is the 6 MSBs of the packet length plus one. In this case, the residue amount is decreased by (256—"the 8 LSBs"). b). If the 8 LSBs of the packet length plus the existing residue amount does not equal or exceed 128, the adjusted packet length is just the 6 MSBs of the packet length. In this case, the residue amount is increased by "the 8 LSBs". Case (b) is the "round down" case where the adjusted packet length is less than the actual packet length (and the accumulated residue amount is increased); case (a) is the "round up" case where the adjusted packet length is more than the actual packet length (and the accumulated residue amount is decreased).

Thus, the adjusted packet length in the above example is roughly 1/256 of the actual packet length, but adjusted so that no matter how many packets are enqueued, the total accumulated length error over time (the residue amount) is always in the range −128 to +127. In other words, once averaged over enough packets, the accumulated error becomes negligible.

FIG. 4 illustrates pseudo-code 400 describing a process used in one embodiment. This example saves the four LSBs of the packet length, and the residue amount is limited to as small a window as possible around zero. The residue amount in this case can have sixteen possible values, and the code keeps the residue amount between −8 and +7 at all times. This ensures that the scheduler for a given queue is never off by more than −8 to +7 bytes, no matter how many packets have been served. The choice of only saving the four LSBs in the above example is arbitrary. Depending on how much instantaneous error in scheduling could be tolerated, the packet lengths could be shortened almost arbitrarily. In fact, if an instantaneous error on the order of one MTU is allowed, the packet lengths could be stored as just one bit (in which case, the residue amount would need to be the size of an MTU).

Additionally, there are many ways to encode the residue amount, and different embodiments may employ different techniques. For example, one embodiment uses a residue amount that ranges between any two numbers. For example, the residue amount may range between zero and some maximum value (e.g., instead of the range of the residue amount being centered at zero). In one embodiment, the adjusted packet lengths are determined in another manner rather than using a simple "round up" or "round down" (e.g., truncated) decision based on the residue amount, and could in fact adjust the stored packet length by any values or amounts. Moreover, one or more of these adjustment amounts may vary over time, such as in response to threshold values being exceeded.

Additionally, the techniques described herein are extensible to many different applications, and are not limited to adjusting packet lengths. For example, these techniques can be used for dynamically adjusting values (e.g., a packet length, processing amount, a size indication, or any other value) corresponding to items of a stream of items or items associated with any entity based on one or more maintained residue amounts in a manner typically to reduce the long-term effect of the error induced by using the adjusted values rather than the original values. Also, the number of embodiments and the manner in which the values are adjusted and the one or more residue amounts are updated are extensible in keeping within the scope and spirit of the invention.

For example, in one embodiment, a threshold value is used in determining how to adjust a particular value. When the threshold value is exceeded in producing an updated residue amount, the value of one is added to produce the adjusted value, and the residue amount is decreased by twice the threshold value. Different embodiments may use different threshold values, which are typically selected to match the needs of the application. In one embodiment, the threshold value is a power of two, and thus, two times the threshold value (e.g., using a multiplication, addition or shift operation, etc.) is the next larger power of two. In one embodiment, an actual mathematical operation (e.g., addition or subtraction) is performed to reduce the residue amount. In one embodiment, overflow bits (i.e., those greater than that required to store the maximum value of the residue) are ignored in producing the updated residue amount. In one embodiment, the value of i is added to produce the adjusted value when the threshold value is exceeded, with i being any integer. In one embodiment, the residue amount is a number maintained in a range between a maximum value x and a minimum value y, and the threshold value is accordingly x+1. In this case, typically the residue amount will be decreased by x−y+1. These are examples of embodiments where the residue amount is a lagging indication (e.g., the residue amount indicates the cumulative original values not included in the adjusted values).

In one embodiment, when the threshold value is not exceeded in producing the adjusted value, the value of one is added to produce the adjusted value, and the residue amount is increased by twice the absolute value of the threshold value (e.g., the threshold value is typically, but not always a negative number, so one or more mathematical operations are typically performed to actually increase the residue amount). In one embodiment, the value of i is added to produce the adjusted value when the threshold value is exceeded, with i being any integer. In this case, typically the residue amount will be increased by i times the threshold value. In one embodiment, the residue amount is a number maintained in a range between a maximum value x and a minimum value y, and the threshold value is accordingly. In this case, typically the residue amount will be increased by x−y+1. These are examples where the residue amount is a forward looking indication (e.g., the residue amount indicates the cumulative adjusted values not included in the original values).

FIG. 1A illustrates a mechanism used in one embodiment for adjusting the identified values 100, which are received by mechanism 101, which determines and maintains adjusted values and maintains and updates one or more residue amounts. These adjusted values are typically stored in storage 102 (e.g., memory or any other storage mechanism) for use by processing element 104 (e.g., a scheduler, packet processor, or any other process or mechanism). The residue amounts used in determining the adjusted values are typically maintained in storage 103 (e.g., registers, flip-flops, memory, or other storage mechanism).

Figure 1B:
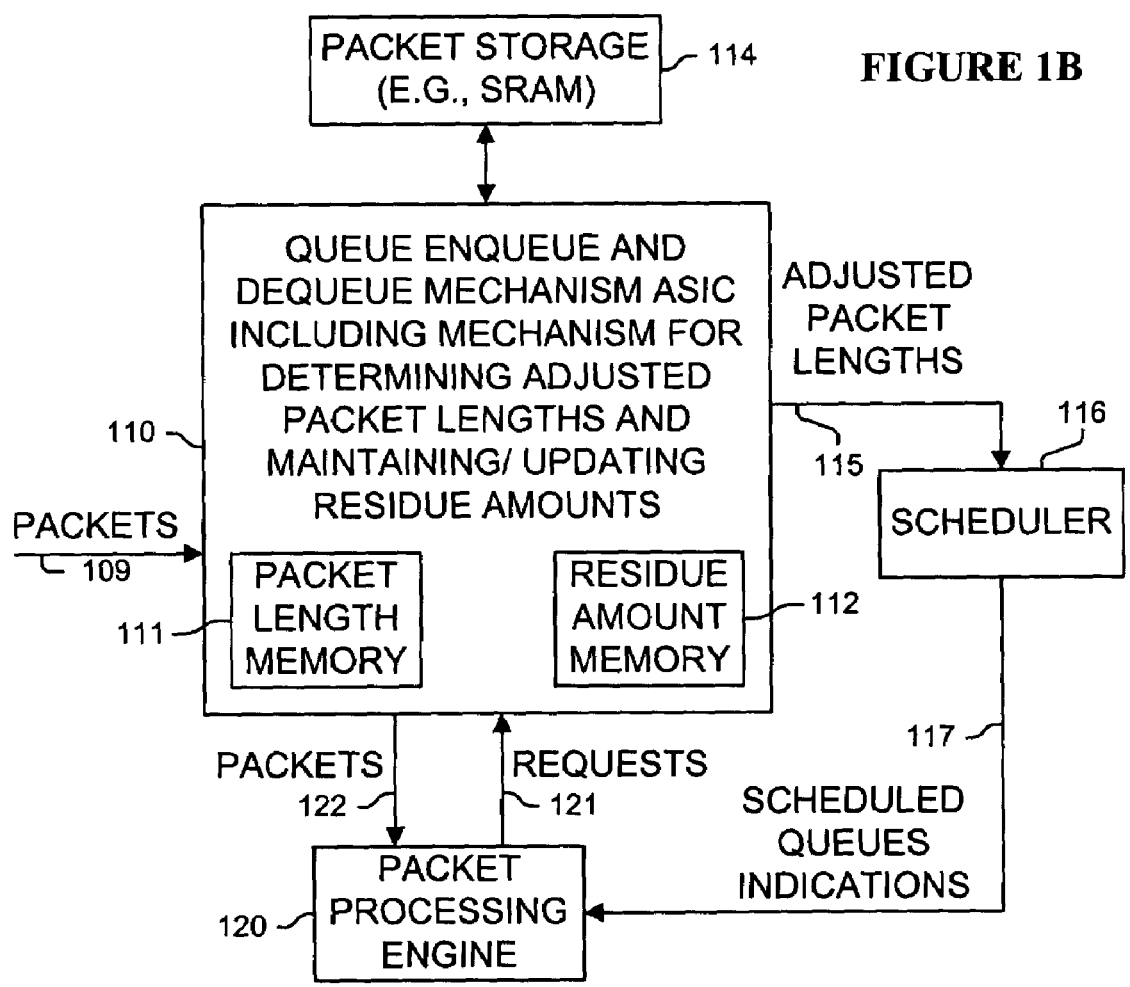
FIG. 1B is a block diagram illustrating one embodiment for adjusting values.

FIG. 1B illustrates a mechanism used in one embodiment for adjusting packet lengths of identified packets 109, which are received by mechanism 110. In one embodiment, mechanism 110 is an ASIC for performing queue enqueue and dequeue operations and includes a mechanism for adjusting values and maintaining and updating one or more residue amounts. As shown, mechanism 110 includes a packet length memory 111 for storing the adjusted packet lengths and a residue amount memory 112 for storing one or more residue amounts. The packets corresponding to the received packets 109 are stored in packet storage 114 (e.g., DRAM or other memory or storage mechanism).

Scheduler 116 receives the adjusted packet lengths 115 (or values based thereon such as a sum of multiple adjusted packet lengths). Based on the adjusted packet lengths 115 and its scheduling mechanism, scheduler 116 determines the scheduled queue indications 117. In response, packet processing engine 120 sends requests 121 to mechanism 110, which retrieves the corresponding packets from packet storage 114 and transmits them to packet processing engine 120 as indicated by packets 122. In one embodiment, packet processing engine 120 includes scheduler 116.

Figure 1C:
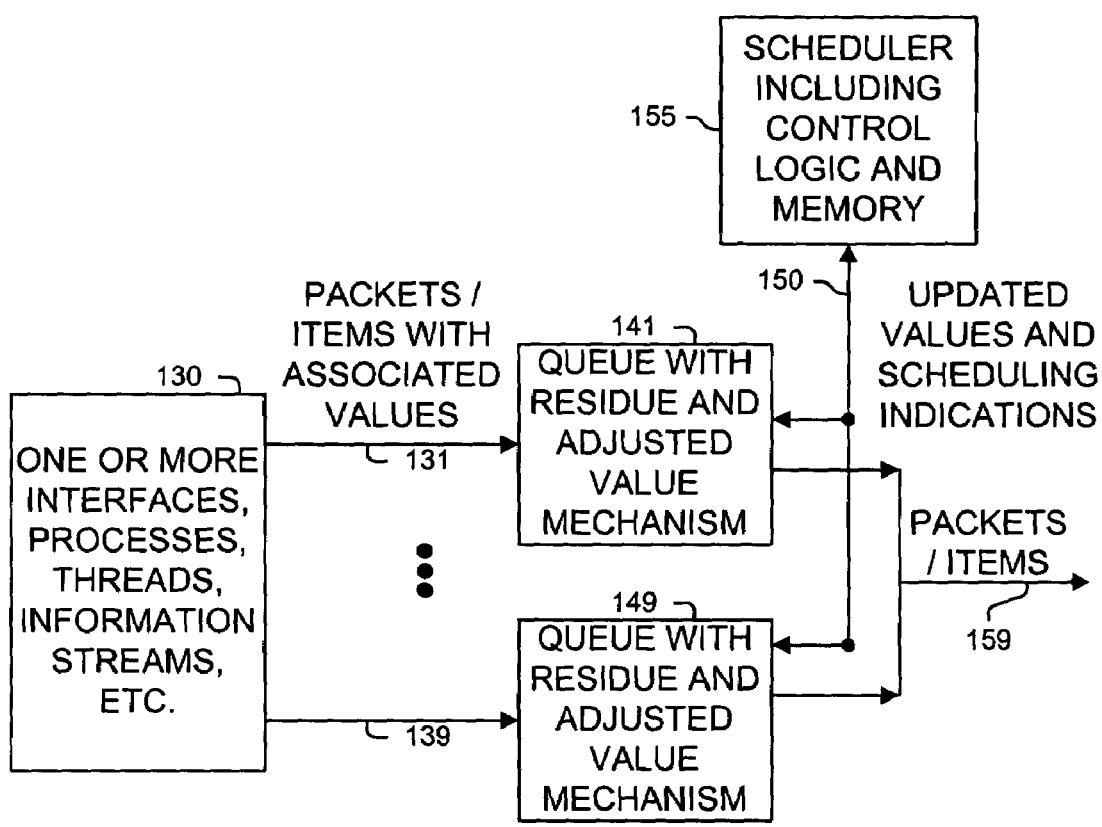
FIG. 1C is a block diagram illustrating one embodiment for adjusting values.

FIG. 1C illustrates one embodiment for adjusting values. One or more interfaces, processes, threads, information streams, etc. 130 generate packets or other items 131-139 associated with values, which are typically stored in queues 141-149. Queues 141-149 include one or more mechanisms to adjust these associated values and maintain and update the residue amounts. Scheduler 155 communicates with queues 141-149 over link 150. Based on these updated values, scheduler 155 generates scheduling indications which cause packets or other items 159 to be transmitted by one or more of queues 141-149.

Figure 1D:
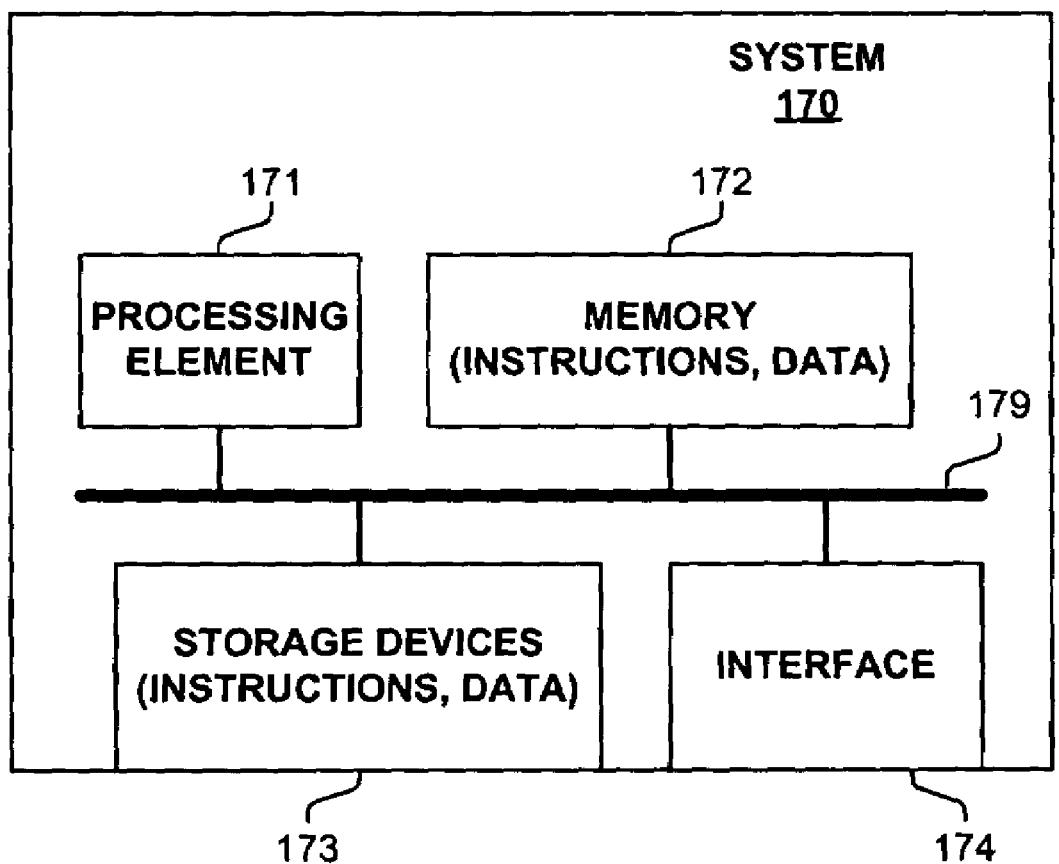
FIG. 1D is a block diagram illustrating one embodiment for adjusting values.

FIG. 1D is a block diagram of exemplary system 170 used in one used in one embodiment. System 170 typically includes mechanisms and means for adjusting values. For example, one embodiment includes a process corresponding to one of the block or flow diagrams illustrated herein, or corresponding to any other means or mechanism implementing all or part of a claim with other internal or external components or devices possibly implementing other elements/limitations of a claim. Additionally, a single or multiple systems, devices, components, etc. may comprise an embodiment.

In one embodiment, system 170 includes a processing element 171, memory 172, storage devices 173, and an interface 174 for receiving and transmitting packets or other items, which are coupled via one or more communications mechanisms 179 (shown as a bus for illustrative purposes).

Various embodiments of system 170 may include more or less elements. The operation of system 170 is typically controlled by processing element 171 using memory 172 and storage devices 173 to perform one or more tasks or processes, such as, but not limited to adjusting values and accordingly updating one or more residue amounts.

Memory 172 is one type of computer-readable medium, and typically comprises random access memory (RAM), read only memory (ROM), flash memory, integrated circuits, and/or other memory components. Memory 172 typically stores computer-executable instructions to be executed by processing element 171 and/or data which is manipulated by processing element 171 for implementing functionality in accordance with one embodiment of the invention. Storage devices 173 are another type of computer-readable medium, and typically comprise solid state storage media, disk drives, diskettes, networked services, tape drives, and other storage devices. Storage devices 173 typically store computer-executable instructions to be executed by processing element 171 and/or data which is manipulated by processing element 171 for implementing functionality in accordance with one embodiment of the invention.

Figure 1E:
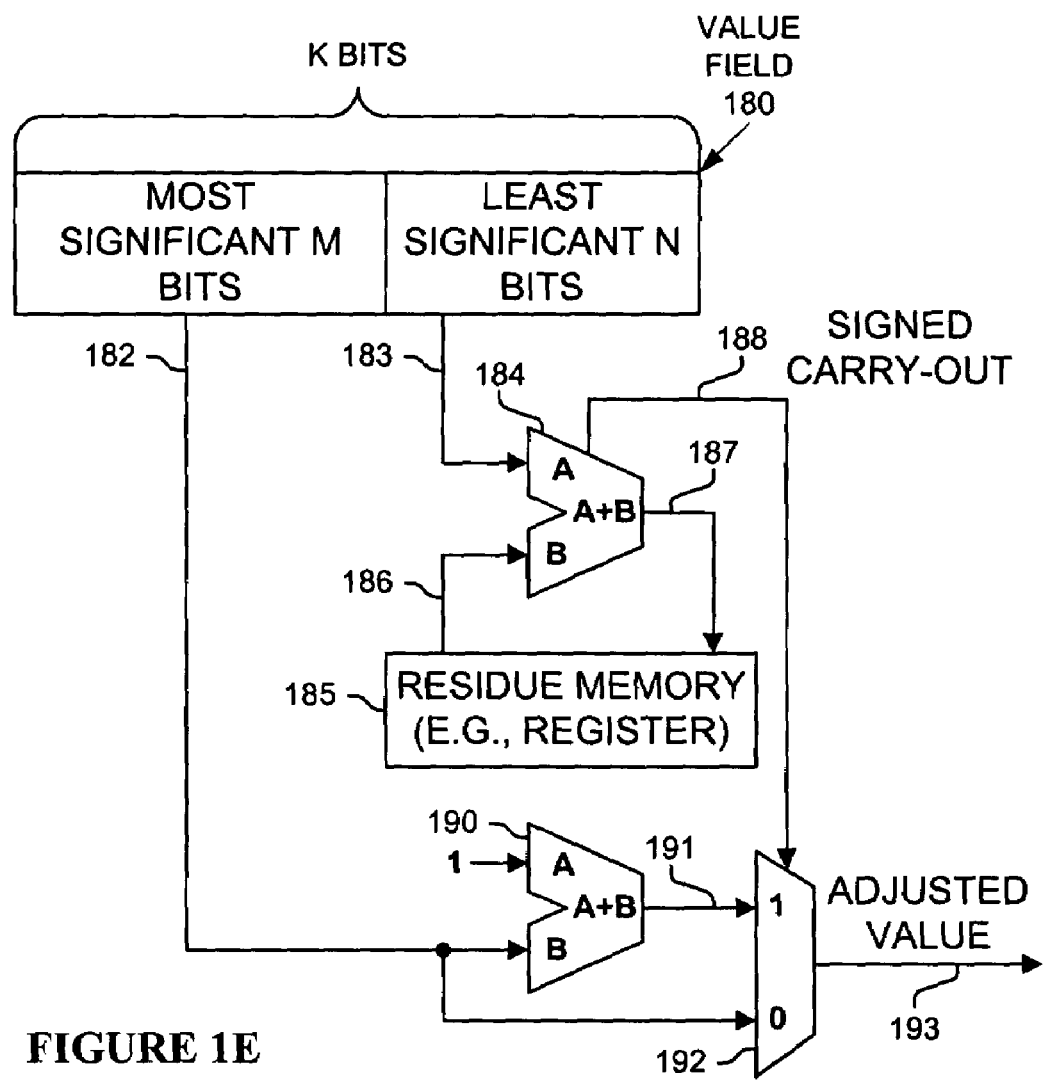
FIG. 1E is a block diagram illustrating a circuit used in one embodiment for adjusting values.

FIG. 1E is a block diagram of a circuit used in one embodiment for adjusting a value identified by value field 180. Note, the term field is used generically, and it does not necessarily require a physical storage or buffering of the value (although one may be used). As shown, value field 180 includes k bits. Also, value field 180 includes a most significant portion 182 including m bits, and a least significant portion 183 including n bits. In one embodiment, k is equal to m plus n. In one embodiment, k is not equal to m plus n. In one embodiment, most significant portion 182 does not overlap with least significant portion 183. In one embodiment, most significant portion 182 does overlap with least significant portion 183.

As shown, a current value of the signed residue amount 186 (stored in residue memory 185) is added to least significant portion 183 by adder 184. The value of the residue amount is then updated based on this sum value 187 and stored in residue memory 185. Note, in one embodiment, the residue amount is stored in a two's complement field of the same length as the size of least significant portion 183, and thus, a single adder 184 may be used. Typically in parallel and substantially simultaneously, adder 190 adds one to most significant portion 182 to generate one plus most significant portion value 191. Based on the signed carry-out result 188 of adder 184, selector 192 selects as adjusted value 193 either most significant portion 182 or one plus most significant portion value 191.

Figure 2A:
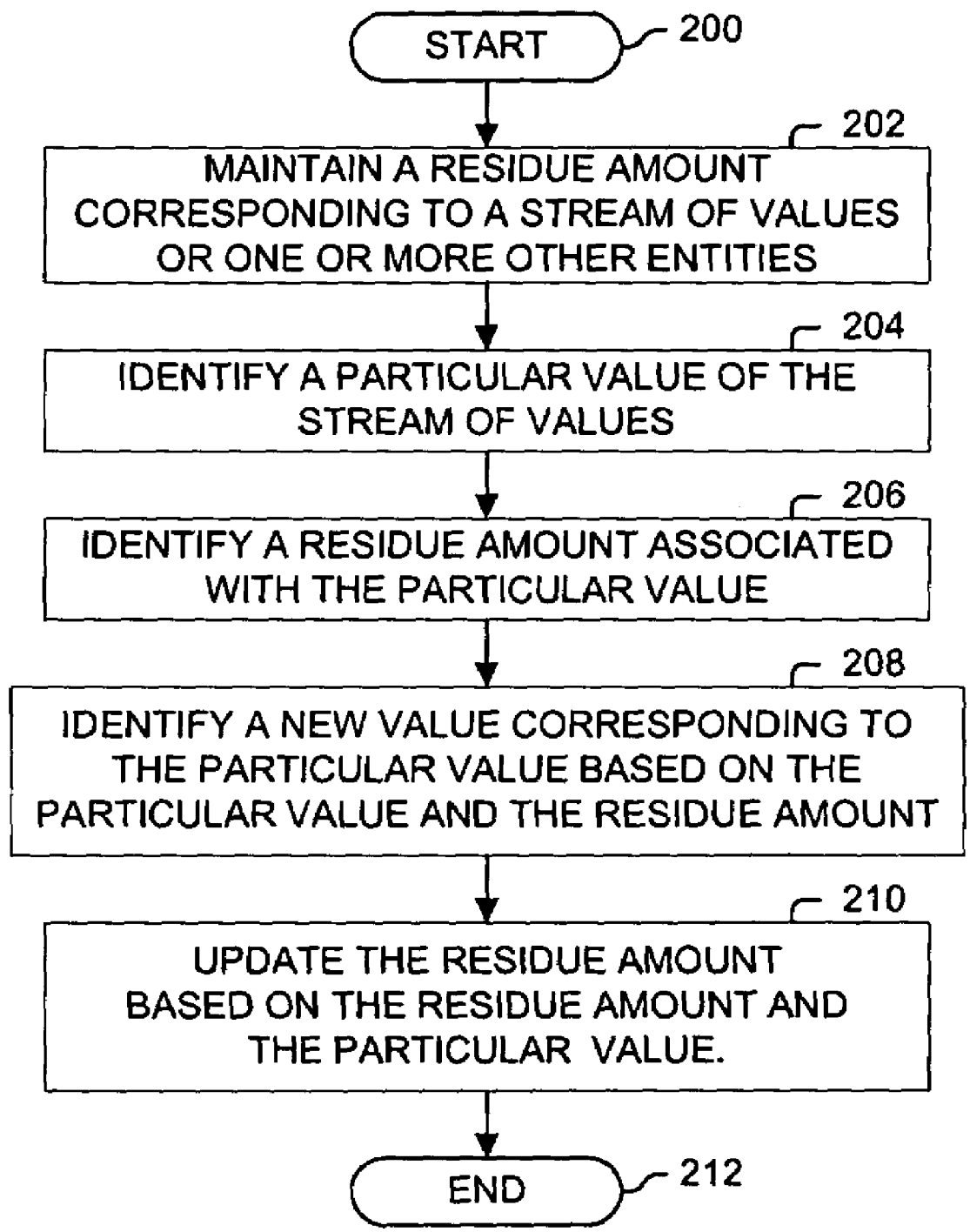
FIG. 2A is a flow diagram illustrating a process used in one embodiment for adjusting values.

FIG. 2A illustrates a process used in one embodiment to adjust a value in a stream of values or one or more other entities. Processing begins with process block 200, and proceeds to process block 202, wherein a residue amount corresponding to a stream of values is maintained. Next, in process block 204, a particular value of the stream of values is identified. In process block 206, a residue amount associated with the particular value is identified. This residue amount may be any value, such as, but not limited to one or more values (e.g., a least significant portion) extracted from the particular value. In process block 208, an adjusted particular value corresponding to the particular value is identified based on the particular value and the residue amount. In process block 210, the residue amount is updated based on the residue amount and the residue amount. Processing is complete as indicated by process block 212.

Figure 2B:
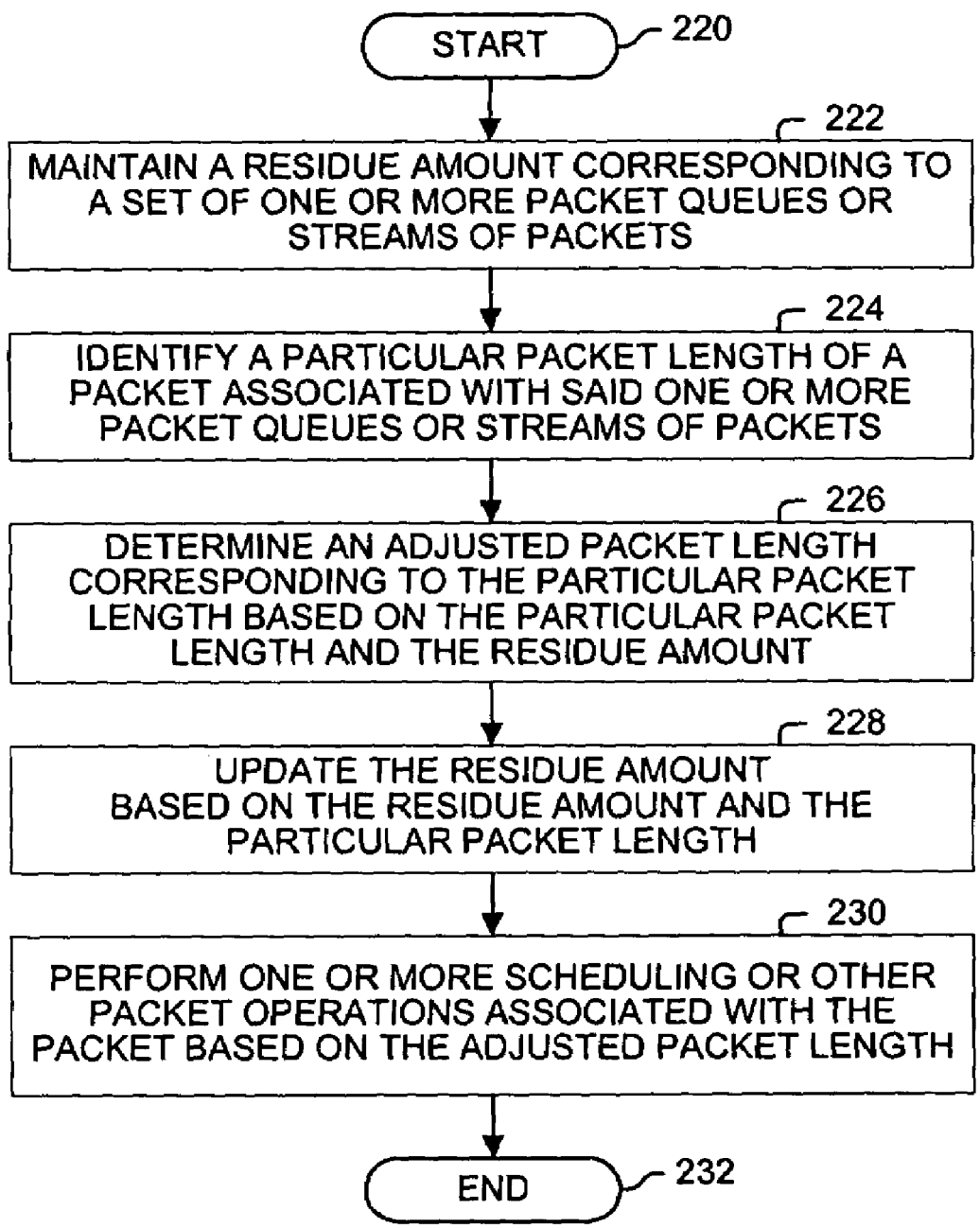
FIG. 2B is a flow diagram illustrating a process used in one embodiment for adjusting values.

FIG. 2B illustrates a process used in one embodiment to adjust a value, in particular a representation of a packet length. Processing begins with process block 220, and proceeds to process block 222, wherein a residue amount corresponding to one or more packet queues or streams of packets is maintained. Next, in process block 224, a particular packet length of a packet associated with said one or more packet queues or streams of packets is identified. In process block 226, an adjusted packet length corresponding to the particular packet length is determined based on the particular packet length and the residue amount. In process block 228, the residue amount is updated based on the residue amount and the particular packet length. In process block 230, one or more scheduling or other packet operations associated with the packet is performed based on the adjusted packet length. Processing is complete as indicated by process block 232.

Figure 3A:
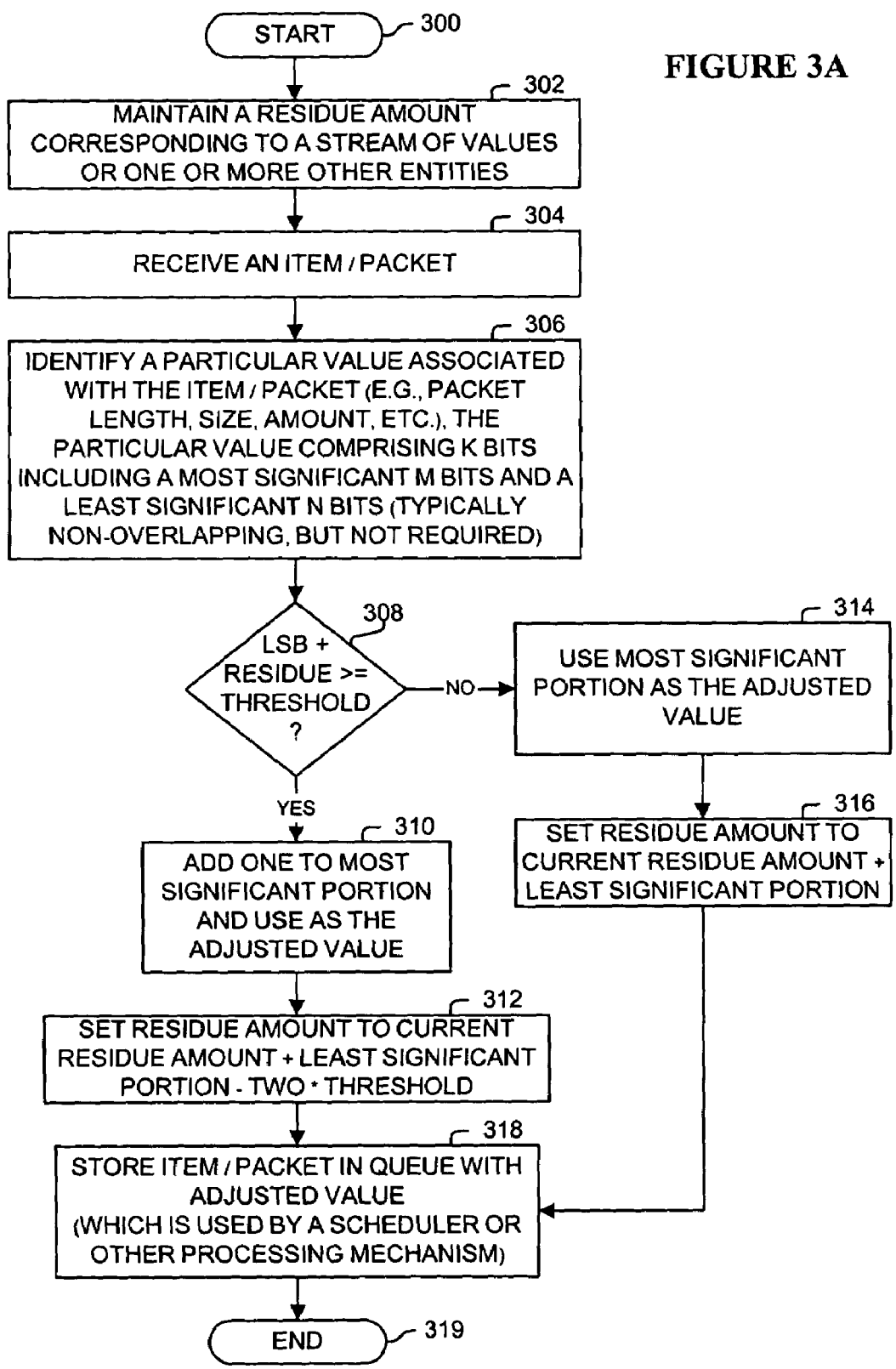
FIG. 3A is a flow diagram illustrating a process used in one embodiment for adjusting values.

FIG. 3A illustrates a process used in one embodiment to adjust a value in a stream of values. Processing begins with process block 300, and proceeds to process block 302, wherein a residue amount corresponding to a stream of values is maintained. In process block 304, a packet or other item corresponding to the stream of values is received. In process block 306, a particular value associated with the item or packet (e.g., packet length, size, amount, etc.) is identified, with the particular value comprising k bits including a most significant m bits and a least significant n bits (typically non-overlapping, but in one embodiment, these fields overlap).

As determined in process block 308, if the least significant bits plus the residue amount is greater than or equal to a threshold value, then in process block 310, one is added to the most significant portion and is used as the adjusted value; and in process block 312, the residue amount is set to the current residue amount plus the least significant portion minus two times the threshold amount. Otherwise, in process block 314, the most significant portion is used as the adjusted value; and in process block 316, the residue amount is set to the current residue amount plus the least significant portion.

In process block 318, the packet or other item is typically stored in a queue or other memory (or immediately processed in another manner) with this adjusted value typically to be used by a scheduler or other processing mechanism. Processing is complete as indicated by process block 319.

Figure 3B:
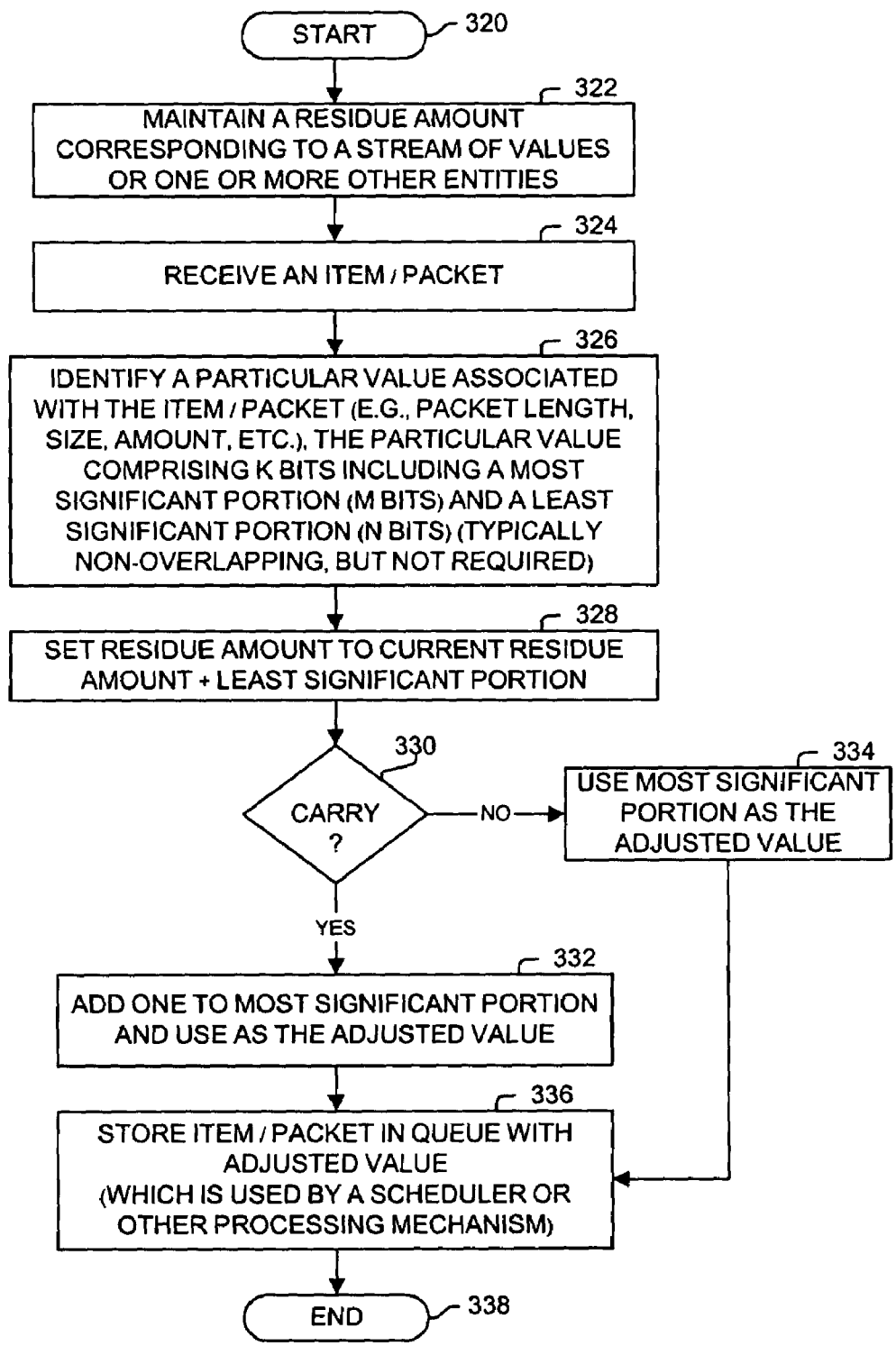
FIG. 3B is a flow diagram illustrating a process used in one embodiment for adjusting values.

FIG. 3B illustrates a process used in one embodiment to adjust a value in a stream of values. Processing begins with process block 320, and proceeds to process block 322, wherein a residue amount corresponding to a stream of values is maintained. In process block 324, a packet or other item corresponding to the stream of values is received. In process block 326, a particular value associated with the item or packet (e.g., packet length, size, amount, etc.) is identified, with the particular value comprising k bits including a most significant m bits and a least significant n bits (typically non-overlapping, but in one embodiment, these fields overlap). In process block 328, the residue amount is increased by the least significant portion of the particular value.

As determined in process block 330, if the residue amount updating operation resulted in a carry value, then in process block 332, one is added to the most significant portion and is used as the adjusted value. Otherwise, in process block 334, the most significant portion is used as the adjusted value. In process block 336, the packet or other item is typically stored in a queue or other memory (or immediately processed in another manner) with this adjusted value typically to be used by a scheduler or other processing mechanism. Processing is complete as indicated by process block 338.

Figure 3C:
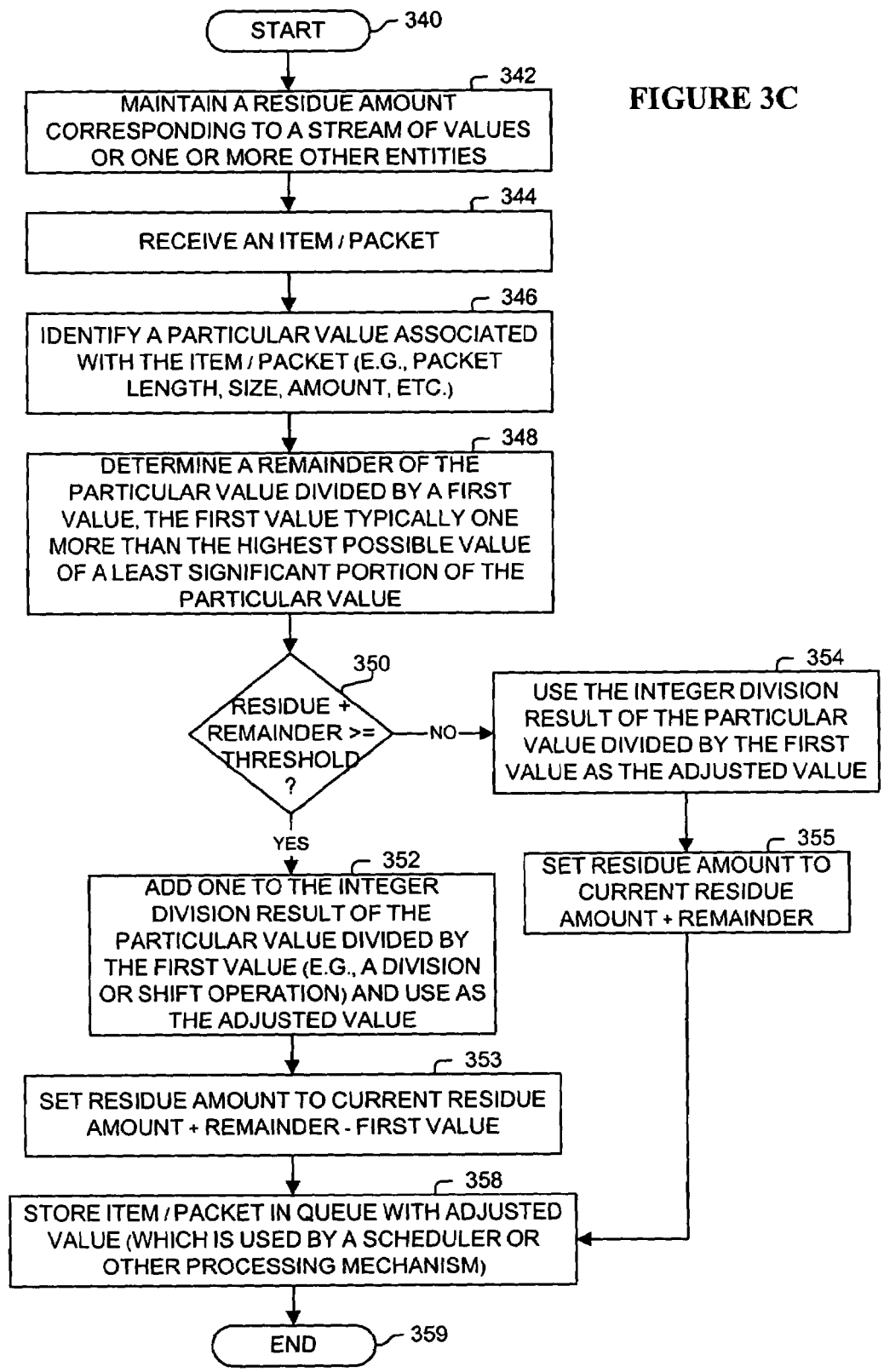
FIG. 3C is a flow diagram illustrating a process used in one embodiment for adjusting values.

FIG. 3C illustrates a process used in one embodiment to adjust a value in a stream of values. Processing begins with process block 340, and proceeds to process block 342, wherein a residue amount corresponding to a stream of values is maintained. In process block 344, a packet or other item corresponding to the stream of values is received. In process block 346, a particular value associated with the item or packet (e.g., packet length, size, amount, etc.) is identified. In process block 348, a remainder of the particular value divided by a first value is determined. The first value is typically, but not in all embodiments, one more than the highest possible value of a least significant portion of the particular value. For example, if the least significant portion includes four bits, its maximum value is two raised to the fourth power minus one (i.e., fifteen), and then in one embodiment, the first value would be sixteen.

As determined in process block 350, if the residue amount plus the remainder is greater than or equal to a threshold value, then in process block 352, one is added to the integer division result of the particular value divided (e.g., a division or shift operation, etc.) by the first value, and this result is used as the adjusted value. In process block 353, the residue amount is set to the current residue amount plus the remainder minus the first value. Otherwise, in process block 354, the integer division result of the particular value divided by the first value is used as the adjusted value; and in process block 355, the residue amount is set to the current residue amount plus the remainder.

Then, in process block 358, the packet or other item is typically stored in a queue or other memory (or immediately processed in another manner) with this adjusted value typically to be used by a scheduler or other processing mechanism. Processing is complete as indicated by process block 359.

Figure 3D:
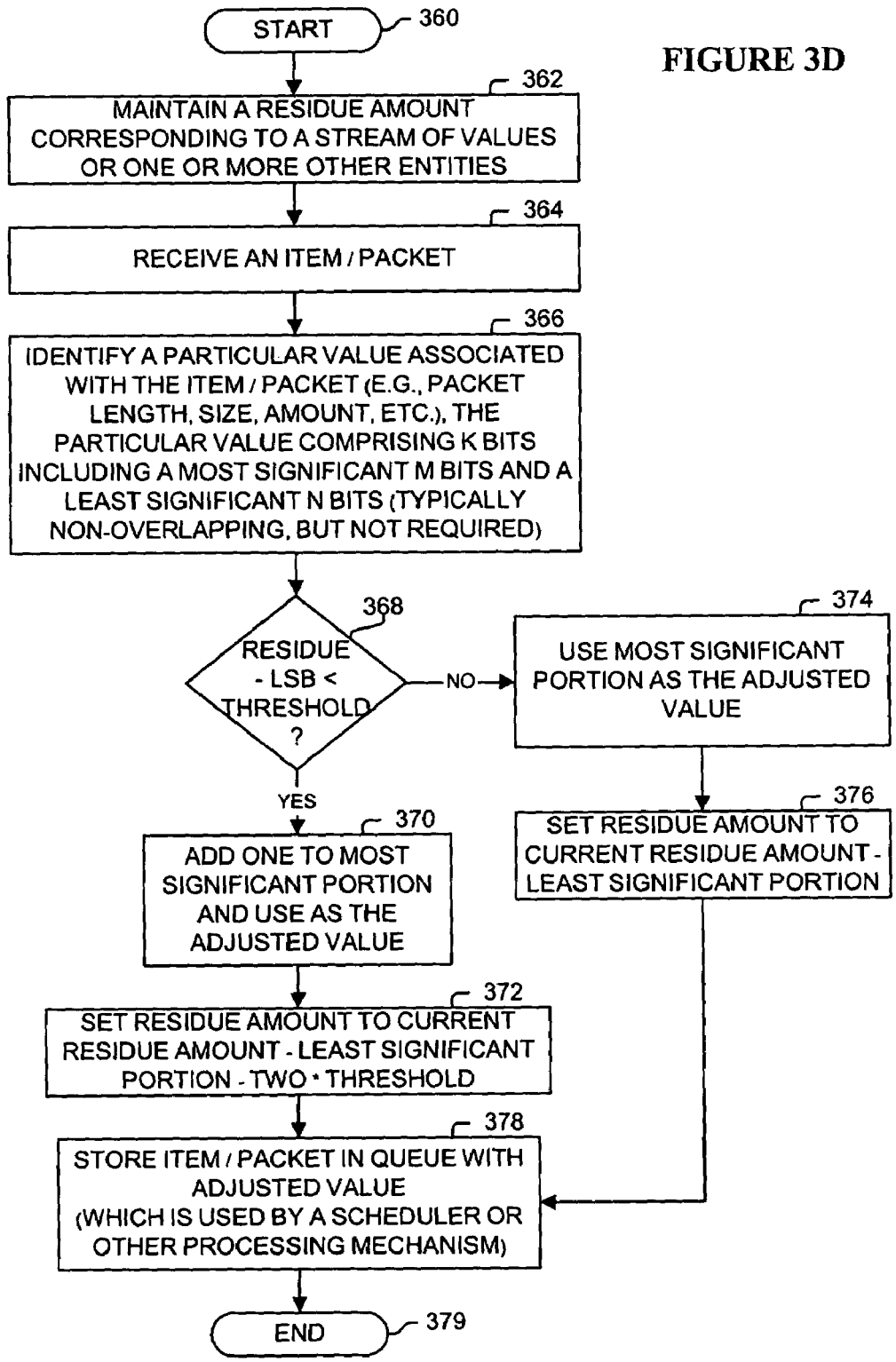
FIG. 3D is a flow diagram illustrating a process used in one embodiment for adjusting values.

FIG. 3D illustrates a process used in one embodiment to adjust a value in a stream of values. Processing begins with process block 360, and proceeds to process block 362, wherein a residue amount corresponding to a stream of values is maintained. In process block 364, a packet or other item corresponding to the stream of values is received. In process block 366, a particular value associated with the item or packet (e.g., packet length, size, amount, etc.) is identified, with the particular value comprising k bits including a most significant m bits and a least significant n bits (typically non-overlapping, but in one embodiment, these fields overlap).

As determined in process block 368, if the residue amount minus the least significant bits is less than a threshold value, then in process block 370, one is added to the most significant portion and is used as the adjusted value; and in process block 372, the residue amount is set to the current residue amount minus the least significant portion minus two times the threshold amount (as the threshold amount is typically negative). Otherwise, in process block 374, the most significant portion is used as the adjusted value; and in process block 376, the residue amount is set to the current residue amount minus the least significant portion.

In process block 378, the packet or other item is typically stored in a queue or other memory (or immediately processed in another manner) with this adjusted value typically to be used by a scheduler or other processing mechanism. Processing is complete as indicated by process block 379.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for adaptively adjusting values, the method comprising:
   maintaining a first residue amount corresponding to a first set of one or more packet queues or streams of packets;
   identifying a first particular packet length of a first packet associated with the first set of said one or more packet queues or streams of packets;
   determining a first adjusted packet length, corresponding to the first particular packet length, based on the first particular packet length and the first residue amount;
   updating the first residue amount based on the first residue amount and the first particular packet length; and
   performing one or more packet operations associated with the first packet based on the first adjusted packet length.

2. The method of claim 1, wherein said one or more packet operations associated with the first packet includes scheduling the first packet.

3. The method of claim 1, comprising:
   maintaining a second residue amount corresponding to a second set of said one or more packet queues or streams of packets;
   identifying a second particular packet length of a second packet associated with the second set of said one or more packet queues or streams of packets;
   determining a second adjusted packet length, corresponding to the second particular packet length, based on the second particular packet length and the second residue amount; and
   updating the second residue amount based on the second residue amount and the second particular packet length.

4. The method of claim 3, comprising performing one or more packet operations associated with the second packet based on the second adjusted packet length.

5. The method of claim 4, wherein said one or more packet operations associated with the first and second packets includes scheduling the first and second packets.

6. The method of claim 1, wherein the first particular packet length includes a first least significant portion; and
wherein said updating the first residue amount includes adding the first residue amount and the first least significant portion.

7. The method of claim 6, wherein the first particular packet length includes the first least significant portion and a first most significant portion; and
wherein said determining the first adjusted packet length includes identifying whether to use the first most significant portion as the first adjusted packet length or a value based on the first most significant portion.

8. The method of claim 7, wherein the value is one more than the first most significant portion.

9. The method of claim 7, wherein said identifying whether to use the first most significant portion as the first adjusted packet length or a value based on the first most significant portion is performed based on a result of said updating the first residue amount.

10. The method of claim 7, wherein said one or more packet operations associated with the first packet includes scheduling the first packet.

11. The method of claim 1, wherein the first residue amount is a lagging behind indication.

12. The method of claim 1, wherein the first residue amount is a forward looking indication.

13. An apparatus for adaptively adjusting values, the apparatus comprising:
a set of one or more packet queues;
a storage mechanism configured to store a residue amount corresponding to the set of said one or more packet queues; and
an update mechanism configured to determine an adjusted packet length of a particular packet associated with the set of one or more packet based on a packet length of the particular packet and the residue amount, and to update the storage mechanism with an updated residue amount.

14. The apparatus of claim 13, wherein the packet length includes a most significant portion and a least significant portion; and
wherein the update mechanism is configured to identify the adjusted packet length from one of a plurality of possible adjusted packet lengths, the plurality of possible adjusted packet lengths including the most significant portion and one more than the most significant portion.

15. The apparatus of claim 14, wherein the update mechanism is configured to update the residue amount based on the least significant portion and the residue amount.

16. The apparatus of claim 13, comprising a packet processing mechanism configured to process packets including processing the particular packet based on the adjusted packet length.

17. The apparatus of claim 13, comprising a scheduler configured to schedule packets including scheduling the particular packet based on the adjusted packet length.

18. The apparatus of claim 13, wherein the first residue amount is a lagging behind indication.

19. The apparatus of claim 13, wherein the first residue amount is a forward looking indication.

20. The apparatus of claim 13, wherein the packet length includes a most significant portion and a least significant portion; and
wherein the update mechanism is configured to identify the adjusted packet length from one of a plurality of possible adjusted packet lengths, the plurality of possible adjusted packet lengths consisting of the most significant portion and one more than the most significant portion.

21. The apparatus of claim 13, wherein the packet length includes a most significant portion and a least significant portion;
and the update mechanism is configured to update the residue amount based on the least significant portion and the residue amount.

22. An apparatus for adaptively adjusting values, the apparatus comprising:
means for maintaining a first residue amount corresponding to a first set of one or more packet queues or streams of packets;
means for identifying a first particular packet length of a first packet associated with the first set of said one or more packet queues or streams of packets;
means for determining a first adjusted packet length, corresponding to the first particular packet length, based on the first particular packet length and the first residue amount; and
means for updating the first residue amount based on the first residue amount and the first particular packet length.

23. The apparatus of claim 22, comprising means for performing one or more packet operations associated with the first packet based on the first adjusted packet length.

24. The apparatus of claim 22, comprising means for scheduling the first packet based on the first adjusted packet length.

25. The apparatus of claim 22, wherein the first particular packet length includes a first least significant portion; and
wherein said means for updating the first residue amount includes means for adding the first residue amount and the first least significant portion.

26. The apparatus of claim 25, wherein the first particular packet length includes the first least significant portion and a first most significant portion; and
wherein said means for determining a first adjusted packet length includes means for identifying whether to use the first most significant portion as the first adjusted packet length or a value based on the first most significant portion.

27. The apparatus of claim 26, wherein the value is one more than the first most significant portion.

28. The apparatus of claim 22, wherein the first residue amount is a lagging behind indication.

29. The apparatus of claim 22, wherein the first residue amount is a forward looking indication.

30. A computer-readable storage medium encoded with computer-executable instructions for performing steps when executed by one or more processing elements for adaptively adjusting values, said steps comprising:
maintaining a first residue amount corresponding to a first set of one or more packet queues or streams of packets;
identifying a first particular packet length of a first packet associated with the first set of said one or more packet queues or streams of packets;

determining a first adjusted packet length, corresponding to the first particular packet length, based on the first particular packet length and the first residue amount; and updating the first residue amount based on the first residue amount and the first particular packet length.

31. The computer-readable storage medium of claim 30, wherein said steps comprise performing one or more packet operations associated with the first packet based on the first adjusted packet length.

32. The computer-readable storage medium of claim 30, wherein said steps comprise scheduling the first packet based on the first adjusted packet length.

33. The computer-readable storage medium of claim 30, wherein the first particular packet length includes a first least significant portion; and wherein said updating the first residue amount includes adding the first residue amount and the first least significant portion.

34. The computer-readable storage medium of claim 33, wherein the first particular packet length includes the first least significant portion and a first most significant portion; and wherein said determining the first adjusted packet length includes identifying whether to use the first most significant portion as the first adjusted packet length or a value based on the first most significant portion.

35. The computer-readable storage medium of claim 34, wherein the value is one more than the first most significant portion.

36. The computer-readable storage medium of claim 34, wherein said identifying whether to use the first most significant portion as the first adjusted packet length or a value based on the first most significant portion is performed based on a result of said updating the first residue amount.

37. The computer-readable storage medium of claim 34, wherein said steps comprise performing one or more packet operations associated with the first packet based on the first adjusted packet length.

38. The computer-readable storage medium of claim 34, wherein said steps comprise scheduling the first packet based on the first adjusted packet length.

39. The computer-readable storage medium of claim 30, wherein the first residue amount is a lagging behind indication.

40. The computer-readable storage medium of claim 30, wherein the first residue amount is a forward looking indication.

* * * * *

UNITED STATES PATENT AND TRADEMARK OFFICE
CERTIFICATE OF CORRECTION

PATENT NO. : 7,349,418 B1  
APPLICATION NO. : 10/617539  
DATED : March 25, 2008  
INVENTOR(S) : Cohen Page 1 of 1

It is certified that error appears in the above-identified patent and that said Letters Patent is hereby corrected as shown below:

Col. 8, Line 23, replace "accordingly." With -- accordingly $y$ --

Signed and Sealed this

Twenty-fourth Day of November, 2009

David J. Kappos  
*Director of the United States Patent and Trademark Office*